US012249256B2

(12) United States Patent
Kucksdorf et al.

(10) Patent No.: US 12,249,256 B2
(45) **Date of Patent: *Mar. 11, 2025**

(54) BOLT SEAL

(71) Applicant: J. J. Keller & Associates, Inc., Neenah, WI (US)

(72) Inventors: Kevin Roger Kucksdorf, Hortonville, WI (US); Alex Julian Kaye, Fond du Lac, WI (US)

(73) Assignee: J.J. Keller & Associates, Inc., Neenah, WI (US)

(*) Notice: Subject to any disclaimer, the term of this patent is extended or adjusted under 35 U.S.C. 154(b) by 0 days.

This patent is subject to a terminal disclaimer.

(21) Appl. No.: 18/485,931

(22) Filed: Oct. 12, 2023

(65) Prior Publication Data

US 2024/0054920 A1 Feb. 15, 2024

Related U.S. Application Data

(63) Continuation of application No. 17/238,666, filed on Apr. 23, 2021, now Pat. No. 11,847,940.

(51) Int. Cl.

| | |
|---|---|
| ***E05B 39/02*** | (2006.01) |
| ***G09F 3/03*** | (2006.01) |
| *B65D 90/22* | (2006.01) |

(52) U.S. Cl.

CPC ............ *G09F 3/0317* (2013.01); *E05B 39/02* (2013.01); *B65D 90/22* (2013.01); *B65D 2211/00* (2013.01)

(58) Field of Classification Search

CPC ............. Y10T 292/48; Y10T 292/4945; Y10T 292/495; Y10T 292/496; Y10T 292/497; Y10T 292/498; Y10T 292/499; Y10T 292/503; Y10T 292/507; Y10T 292/509; Y10T 292/51; Y10T 292/528; G09F 3/03; G09F 3/0305; G09F 3/0317; G09F 3/0376; G09F 3/0329; E05B 39/02; B65D 90/22; B65D 2211/00

See application file for complete search history.

(56) References Cited

U.S. PATENT DOCUMENTS

| | | | | |
|---|---|---|---|---|
| 5,402,958 A * | 4/1995 | Mahaney | G09F 3/0352 | 292/307 R |
| 6,747,558 B1 | 6/2004 | Thorne et al. | | |
| 7,042,354 B2 * | 5/2006 | Auerbach | G09F 3/0317 | 340/568.2 |
| D548,041 S | 8/2007 | Littrell et al. | | |

(Continued)

FOREIGN PATENT DOCUMENTS

| | | | |
|---|---|---|---|
| EP | 1275099 B1 | 7/2008 | |
| WO | WO-2006032166 A1 * | 3/2006 | E05B 39/00 |
| WO | WO-2011158150 A1 * | 12/2011 | G09F 3/03 |

OTHER PUBLICATIONS

WO2011158150A1 description with paragraph reference numbers (Year: 2011).*

*Primary Examiner* — Kristina R Fulton
*Assistant Examiner* — Christopher F Callahan
(74) *Attorney, Agent, or Firm* — Wong Meyer Smith & McConnell

(57) ABSTRACT

A bolt seal including a pin and a barrel where the barrel has a storage position on the pin and a lock position on the pin, the bolt seal optionally including a restrainer and optionally being packaged in a container in a common orientation with other bolt seals.

4 Claims, 13 Drawing Sheets

(56) References Cited

U.S. PATENT DOCUMENTS

| | | | | |
|---|---|---|---|---|
| D563,765 | S | 3/2008 | Littrell et al. | |
| D565,387 | S | 4/2008 | Remark et al. | |
| D568,716 | S | 5/2008 | Littrell et al. | |
| 7,438,334 | B2 | 10/2008 | Terry et al. | |
| D592,038 | S | 5/2009 | Lettrell et al. | |
| D592,984 | S | 5/2009 | Littrell et al. | |
| 7,612,669 | B2 | 11/2009 | Brigham | |
| D607,301 | S | 1/2010 | Chen | |
| 7,721,407 | B2 | 5/2010 | Littrell et al. | |
| 7,753,633 | B2 | 7/2010 | Genick, II | |
| 7,883,126 | B2 | 2/2011 | Terry et al. | |
| 7,883,127 | B2 | 2/2011 | Terry et al. | |
| 7,883,128 | B2 | 2/2011 | Terry et al. | |
| 7,900,980 | B2 | 3/2011 | Terry et al. | |
| 7,938,459 | B2 | 5/2011 | Terry et al. | |
| 8,026,816 | B2 | 9/2011 | Chao Cheng | |
| 8,087,705 | B2 * | 1/2012 | Littmann | G09F 3/0317 292/307 R |
| 8,207,848 | B2 | 6/2012 | Berger et al. | |
| 8,960,737 | B2 | 2/2015 | Nazzari | |
| 8,963,712 | B2 | 2/2015 | Mullis et al. | |
| 8,991,879 | B2 * | 3/2015 | Debrody | F16B 19/00 292/327 |
| 9,121,195 | B2 | 9/2015 | Mullis et al. | |
| 9,472,125 | B2 | 10/2016 | Debrody et al. | |
| 9,508,271 | B2 | 11/2016 | Chen | |
| 9,624,692 | B2 | 4/2017 | Mullis et al. | |
| 9,677,300 | B2 | 6/2017 | Mullis et al. | |
| 10,109,221 | B2 | 10/2018 | Yazdi et al. | |
| 10,119,301 | B2 | 11/2018 | Mullis et al. | |
| 10,145,146 | B2 | 12/2018 | Mullis et al. | |
| 10,235,908 | B2 | 3/2019 | Yazdi et al. | |
| 10,497,289 | B2 | 12/2019 | Debrody et al. | |
| 2004/0041705 | A1 * | 3/2004 | Auerbach | E05B 39/005 340/568.1 |
| 2007/0007776 | A1 | 1/2007 | Beard et al. | |
| 2007/0052539 | A1 * | 3/2007 | Brown | B65D 90/008 340/571 |
| 2016/0146239 | A1 * | 5/2016 | Nazzari | F16B 41/005 70/232 |
| 2017/0103683 | A1 * | 4/2017 | Yazdi | G09F 3/0329 |
| 2019/0145129 | A1 * | 5/2019 | Mullis | B65D 90/22 292/307 R |

* cited by examiner

BOLT SEAL

CROSS REFERENCE TO RELATED APPLICATION

This application is a continuation of and claims priority to U.S. Ser. No. 17/238,666, filed on Apr. 23, 2021, the entire contents of which is incorporated herein by reference.

FIELD OF THE INVENTION

The invention relates to a bolt seal.

BACKGROUND OF THE INVENTION

To deter unauthorized access to doors and the like, security seals are commonly used to secure cargo trailer and shipping containers doors to provide evidence of tampering and serial number traceability. This is accomplished by inserting a steel pin through a hole in a lock and then connecting a locking barrel to the pin.

Current bolt seals include a pin and a barrel that are fabricated of metal parts that are either uncoated or plastic overmolded. Plastic overmolded components are typically laser engraved with text and matching serial numbers on both the pin and the barrel to provide tracking and evidence of tampering. To ensure a matched set is packaged properly, the bolt and barrel are connected by a molded-in plastic bridge.

To install a bolt seal, the pin and the barrel are snapped apart and separated at the bridge which leaves sharp edges of the plastic overmold and can litter the ground with debris which is an environmental issue. When the door needs to be opened, the bolt seal is cut apart using bolt cutters during which the two sharp halves of the pin fly apart at a high rate of speed and can act as high speed projectiles which can cause injury. After cutting, the pin halves fall to the ground which requires constant repetitive bending over by a user to retrieve the pieces from the ground. Many cut pin halves remain laying on the ground and thus can cause vehicle tire punctures which are time consuming, costly to repair and can remove a vehicle from service. If not caught in time, it is possible the littered pin halves may cause a vehicle to become inoperable or can cause an accident on the roadway.

Current plastic overmolded bolt seals have tamper evident features such as tabs that either deform or break off when the barrel is rotated so as to provide a visual clue of tampering. However, this type of tamper evident feature can be easily defeated such as by spinning the barrel with a drill which causes the pin to release from the barrel without noticeable damage. The barrel can then be reattached without any evidence of tampering.

SUMMARY OF THE INVENTION

In one construction, the disclosure provides a bolt seal including a pin having a tip and a barrel. The barrel has a storage position surrounding the tip and is moveable to a locking position surrounding the tip such that the pin and the barrel are lockingly secured together.

In another construction, the disclosure provides a bolt seal including a pin having thereon a key and a barrel having therein a first keyway and a second keyway. The barrel has a first position relative to the pin with the key in the first keyway and the barrel has a second position relative to the pin with the key in the second keyway.

In another construction, the disclosure provides a bolt seal for use with a lock including a pin having a first end and a second end, a barrel lockingly secured to the first end of the pin and a retainer connecting the second end of the pin to the barrel such that when the pin is severed into two pieces after use of the bolt seal has ended, the retainer enables the bolt seal to be removed from the lock in one piece.

In another construction, the disclosure provides a bolt seal package including a packaging container and a plurality of bolt seals. Each bolt seal has a pin and a barrel. Each bolt seal is housed in the container with the barrel in line with the pin so that each bolt seal has a common orientation relative to the container so as to maximize the number of bolt seals housed in the container.

Other aspects of the disclosure will become apparent by consideration of the detailed description and accompanying drawings.

DETAILED DESCRIPTION OF THE INVENTION

Before any constructions of the disclosure are explained in detail, it is to be understood that the disclosure is not limited in its application to the details of construction and the arrangement of components set forth in the following description or illustrated in the following drawings. The disclosure is capable of other constructions and of being practiced or of being carried out in various ways.

Figure 1:
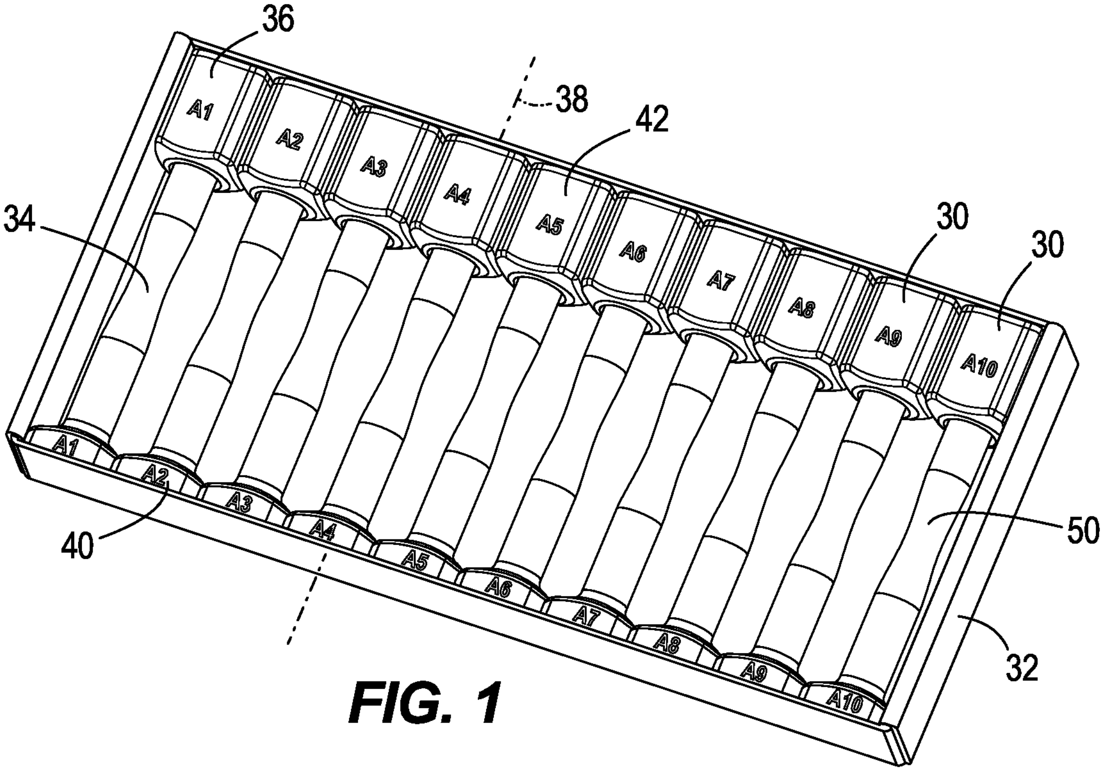
FIG. 1 is a perspective view of bolt seals of the present invention in a container without a top cover.

FIG. 1 illustrates a plurality of bolt seals 30 housed in a container 32 without a top cover. As shown, the container 32 is a shipping box but other containers can also be utilized. Each bolt seal 30 includes a pin 34 and a barrel 36. The barrel 36 is housed in the container 32 and in line with the pin 34 along an axis 38 to form a generally rectangular linear profile in the container 32 thus maximizing the number of bolt seals 30 that can be housed in the container 32. All of the bolt seals 30 are housed in the container 32 in the same orientation relative to the container 32. The linear compact design of the bolt seals 30, which does not include a bulky obtuse bridge, allows for higher density packaging resulting in storage space savings and easy retrieval/distribution of bolt seals 30 in a sequential or particular order. Each pin 34 and associated barrel 36 preferably have thereon indicia 40, 42 respectively, such as matching numbering, as a tamper proof measure to make sure the same pin 34 and the same barrel 36 remain together. Preferably, the bolt seals 30 in the container 32 are in a numbered sequential or other particular order.

Figure 2:
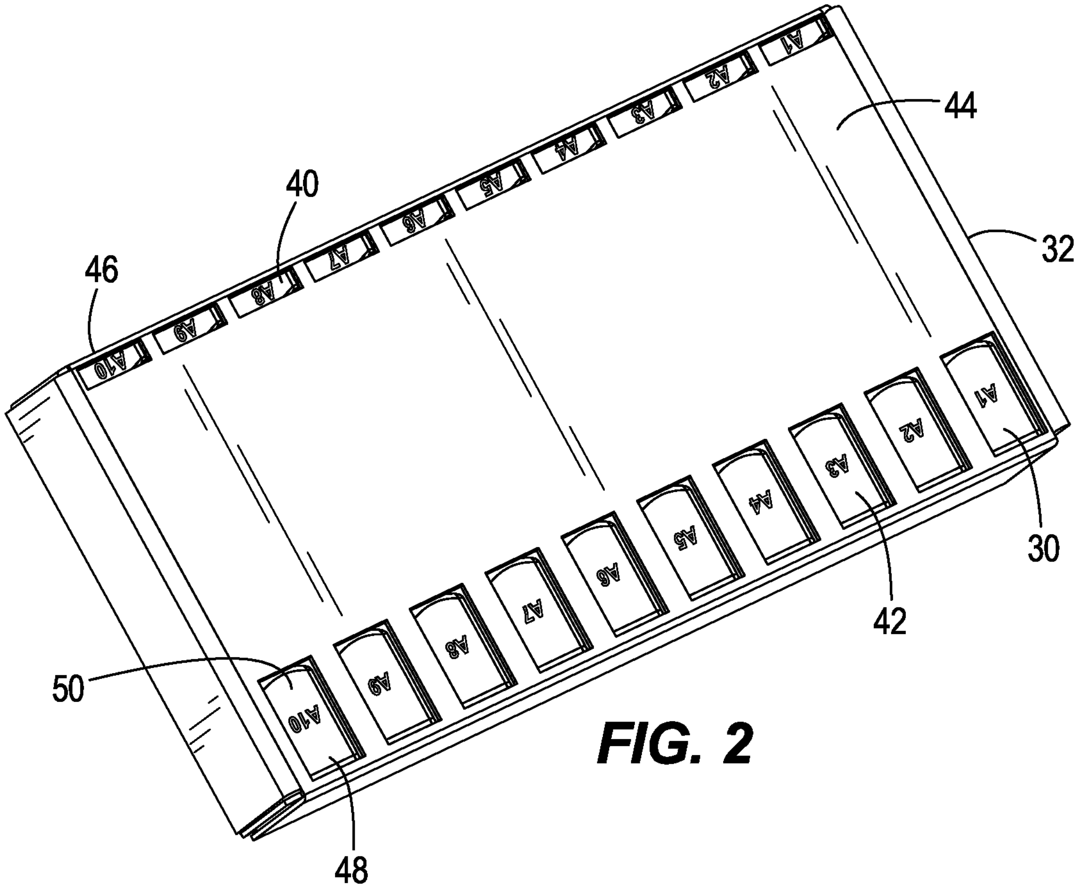
FIG. 2 is a perspective view of the bolt seals in the container with a top cover.

Turning to FIG. 2, the container 32 with bolt seals 30 therein is shown with a top cover 44. The top cover 44 has apertures 46, 48 that align with the indicia 40 on the pin and the indicia 42 on the barrel. The apertures 46, 48 enable the bolt seals 30 to have the indicia lasered, stamped or printed onto the pin 34 and the barrel 36 while the bolt seals 30 are housed in the container 32. The apertures 46, 48 allow a user to see the indicia 40, 42, such as the sequential numbering, through the apertures 46, 48 without having to open the container 32 by removing the top cover 44.

As shown in FIGS. 1 and 2, the bolt seals 30 are overmolded with plastic 50. However, it should be noted that the bolt seals 30 can be fabricated without overmolding onto the pin 34 and the barrel 36. The non-overmolded bolt seals are positioned in the container 32 in the same orientation as the overmolded bolt seals and the non-overmolded bolt seals can be etched with indicia through the apertures 46, 48 in the cover 44.

Figure 3:
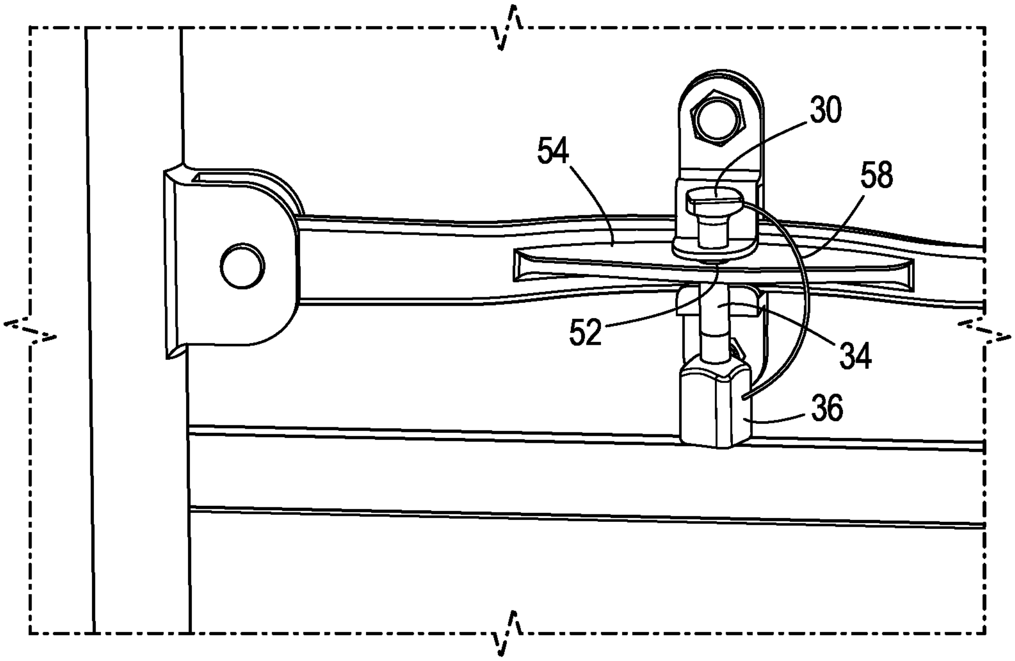
FIG. 3 is a perspective view of a bolt seal with a restrainer in use on a lock of a door.

As shown in FIG. 3, the bolt seal 30 is designed to secure a door such as, for example, on a shipping container, a cargo container, or a trailer, to prevent unauthorized access to through the door and to provide evidence of tampering. This is accomplished by inserting the pin 34 through an aperture 52 in a lock 54 or like device and lockably securing the barrel 36 to the pin 34. Attempting to rotate the barrel 36 or pulling it does not remove the barrel 36 from the pin 34.

Figure 4:
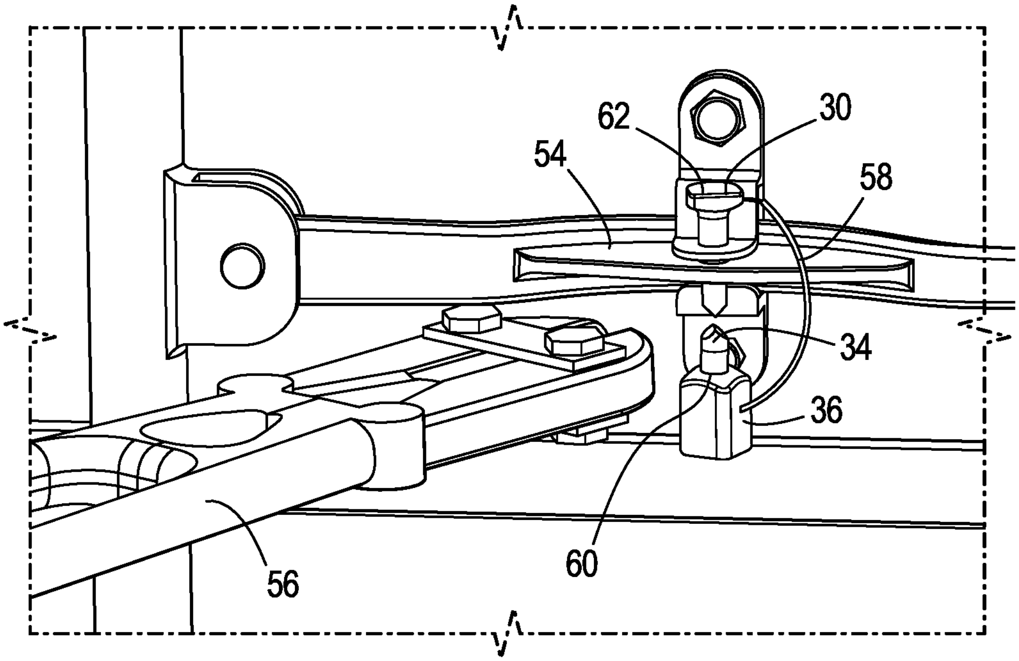
FIG. 4 is a perspective view of a bolt seal with a restrainer on the lock and severed by bolt cutters.

As shown in FIG. 4, to remove the bolt seal 30 from the lock 54 after use, the pin 34 is severed in half such as by using bolt cutters 56 or like tools. The bolt seal 30 can then be removed from the lock 54. Optionally, the bolt seal 30 can include a retainer 58 fabricated of molded in plastic, fiber, plastic filament, wire rope or other retainers. The pin 34 includes a first end 60 that interacts with the barrel 36 and includes a second end 62. The retainer 58 permanently connects or tethers the barrel 36 to the second end 62 of the pin 34 thereby keeping the components together and preventing the components from ricocheting and becoming a dangerous projectile. When the pin 34 is severed as shown in FIG. 3, the retainer 58 prevents the two halves of the bolt seal 30 from flying apart and possibly causing injury to a user. The retainer 58 ensures that the pieces of the severed bolt seal 30 do not fall to the ground and remain there as debris that is not environmentally sound and can be run over by a vehicle causing tire puncture damage. Further, instead of a user reaching down to pick up thousands of sharp cut bolts, a user would only need to pull the entire one piece bolt seal 30 out from the lock 54 and discard. The retainer 58 also acts as a tamper evidence indicator. If the retainer 58 is cut, frayed, broken or twisted, this is a visual indication that the bolt seal may have been tampered with.

As shown in FIGS. 3 and 4, the bolt seal 30 is overmolded with plastic. However, it should be noted that the bolt seal 30 can also be fabricated without overmolding onto the pin 34 and the barrel 36. The non-overmolded bolt seals are positioned in the lock 54 in the same orientation as with the overmolded bolt seals.

Figure 5:
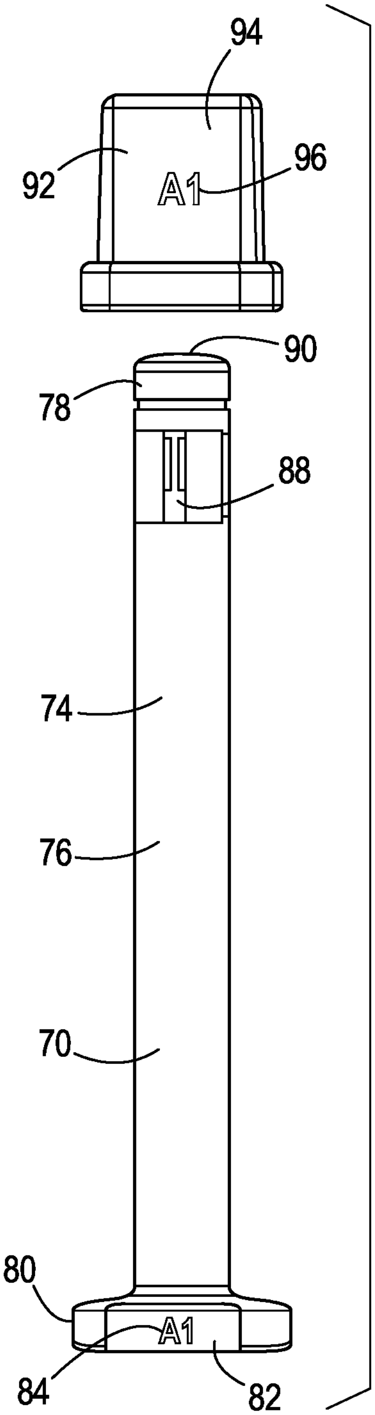
FIG. 5 is a perspective view of one embodiment of an overmolded bolt seal with a barrel separated from a pin.
Figure 6:
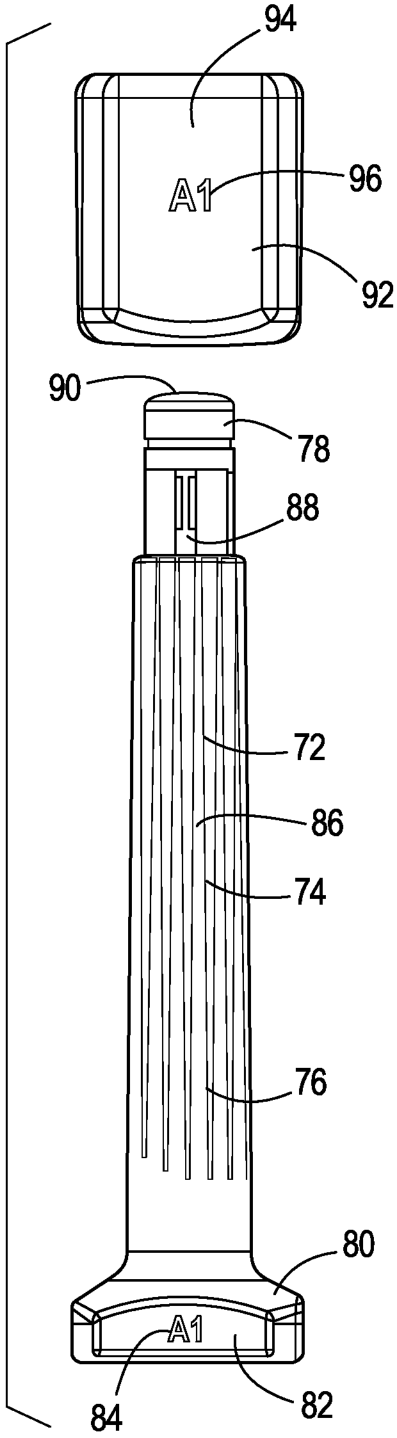
FIG. 6 is a perspective view of one embodiment of an overmolded bolt seal with a barrel separated from a pin.

Turning now to one embodiment of a bolt seal, shown in FIG. 5 is a bolt seal 70 without overmolding and shown in FIG. 6 is a bolt seal 72 with overmolding where like components have like reference numbers. The pin 74 is manufactured of a metal such as ferrous, non-ferrous or a composite, however, other types of rigid material can also be used. The pin 74 includes a shaft 76 having a first end 78 and a second end 80. The second end 80 includes an end cap 82 having indicia 84 thereon. The pin 74 can include ribs 86 for gripping by a user. Near the first end 78 of the pin 74 is a metal key 88 that has been machined, hot or cold headed or swaged on the pin 74 and specifically not overmolded onto the pin 74. As shown, the key 88 is rectangular shaped, however, different shaped keys can also be utilized. The pin 74 terminates at the first end 78 in a tip 90 that is bullet shaped.

Figure 7:
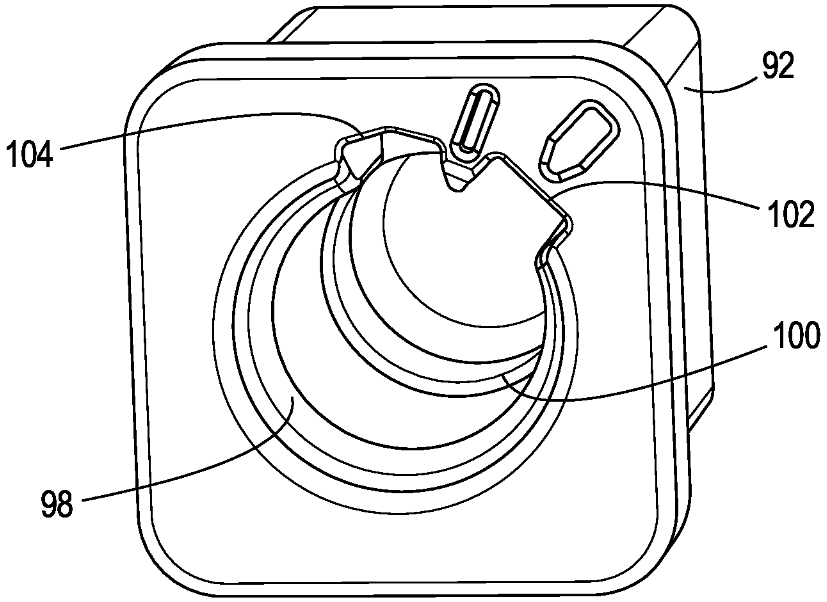
FIG. 7 is a perspective view of the barrel of the bolt seal of FIG. 5.
Figure 8:
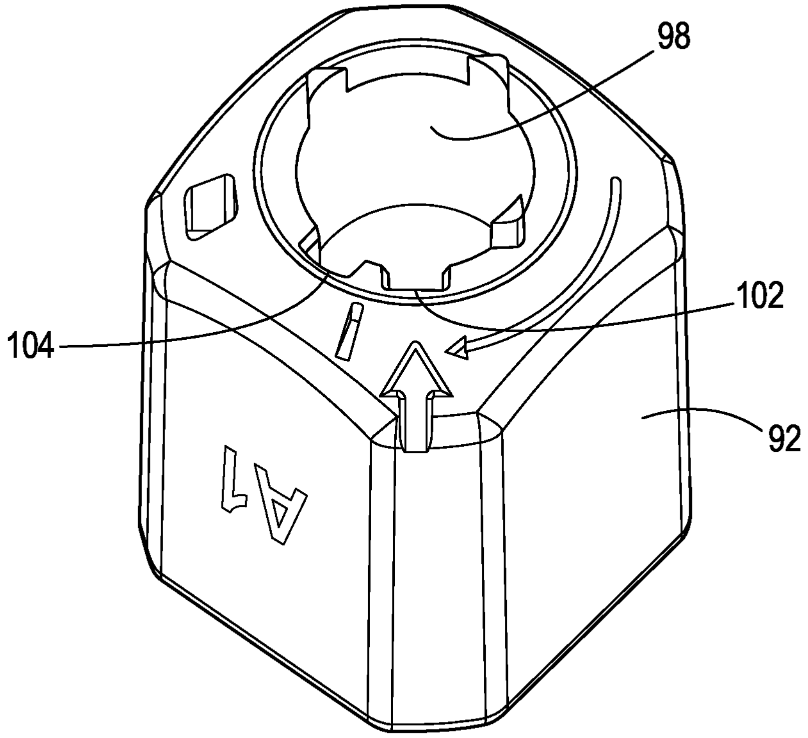
FIG. 8 is a perspective view of an overmolded barrel of the bolt seal of FIG. 6.

A barrel 92 is manufactured of a metal such as ferrous, non-ferrous or a composite, however, other types of rigid material can also be utilized. The barrel 92 has an exterior 94 optionally having indicia 96 thereon. The barrel 92 has an interior 98 adapted to house the tip 90 of the pin 74 and includes at least one retaining ring 100 (as best shown in FIGS. 7 and 8). One retaining ring is shown however, multiple rings can also be used. In the overmolded pin 74 of FIG. 6, ribs 86 can optionally be molded onto the pin 74 so as to aid a user in gripping and holding the pin 74. Optionally, the shape of the overmolding on the pin 74 can be contoured so to be more ergonomic to a user.

As shown in FIG. 7 without overmolding and as shown in FIG. 8 with overmolding, the interior 98 of the barrel 92 is defined by at least two metal keyways such as a first keyway 102 and a second keyway 104 that are complementally shaped to the key 88 and that prevent the pin 74 from rotating in the barrel 92. The first keyway 102 is adapted to hold the barrel 92 on the tip 90 with pressure, such as a slight interference or a detent, to prevent the barrel 92 from sliding off or releasing from the pin 74 during shipping, storage or before use on a lock collectively a storage position or configuration. The bolt seal 70, 72 is bridgeless in that a bridge does not secure the barrel 92 to the pin 74 in the storage position. The second keyway 104 and the retaining ring 100 are adapted to hold the barrel 92 on the tip 90 in a locking position or configuration during use so that the pin 74 cannot be removed from the barrel 92 by rotating or pulling.

The first keyway 102 and the second keyway 104 can be any desired number of degrees apart such as 15-110 degrees and more specifically from 40-90 degrees for example. In the lock position, the metal key 88 is in contact with the metal keyways 102, 104 which produces a strong anti-rotation design between metal parts. The first keyway 102 and the second keyway 104 as shown are of differing lengths, however, they can also be the same length. Preferably, the first keyway 102 is shorter than the second keyway 104 such that when the key 88 of the pin 74 is in the first keyway 102, the pin 74 cannot rotate in the barrel 92 and it does not contact the retaining ring 100 so the pin 74 can be removed from the barrel with a linear motion in that it is not locked in the barrel 92. The shorter first keyway 102 prevents the pin 74 from becoming locked in the barrel 92 and not removable by a user with a linear pulling motion. Preferably, the first keyway 102 and second keyway 104 are blind keyways in that they terminate within the barrel 92.

Figure 10:
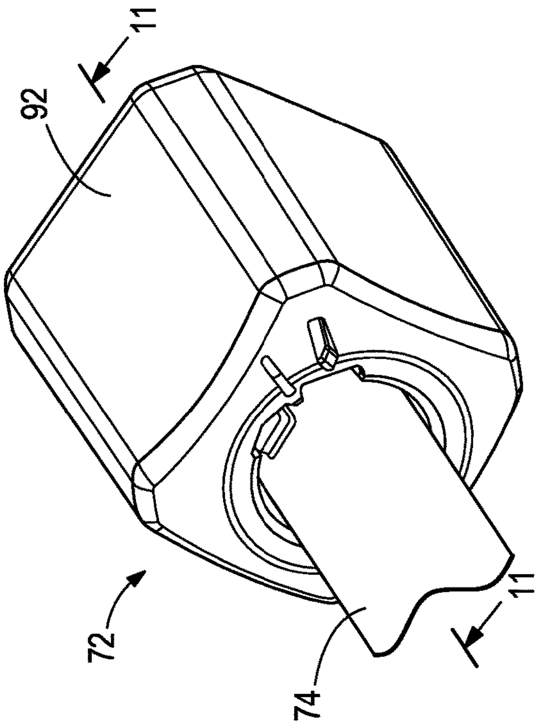
FIG. 10 is a perspective view of the overmolded bolt seal of FIG. 6 in the storage position.
Figure 9:
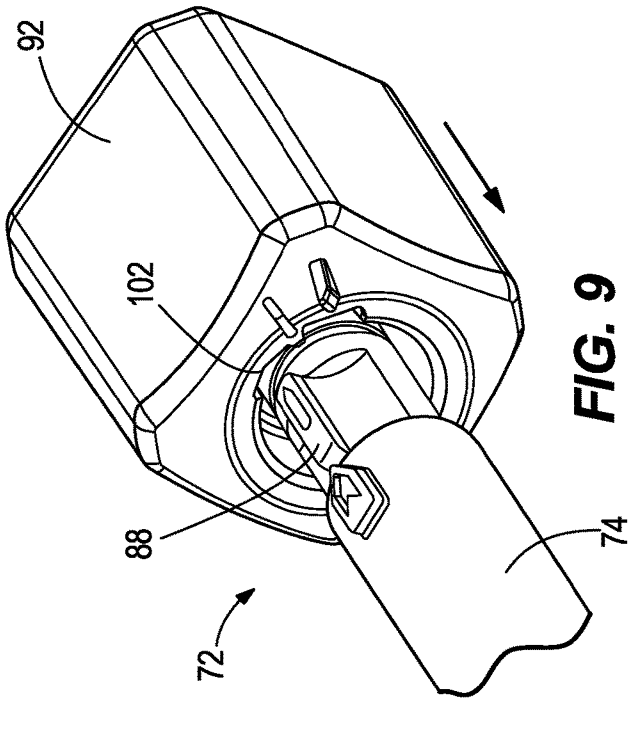
FIG. 9 is a perspective view of an overmolded bolt seal of FIG. 6 being placed in a storage position.
Figure 11:
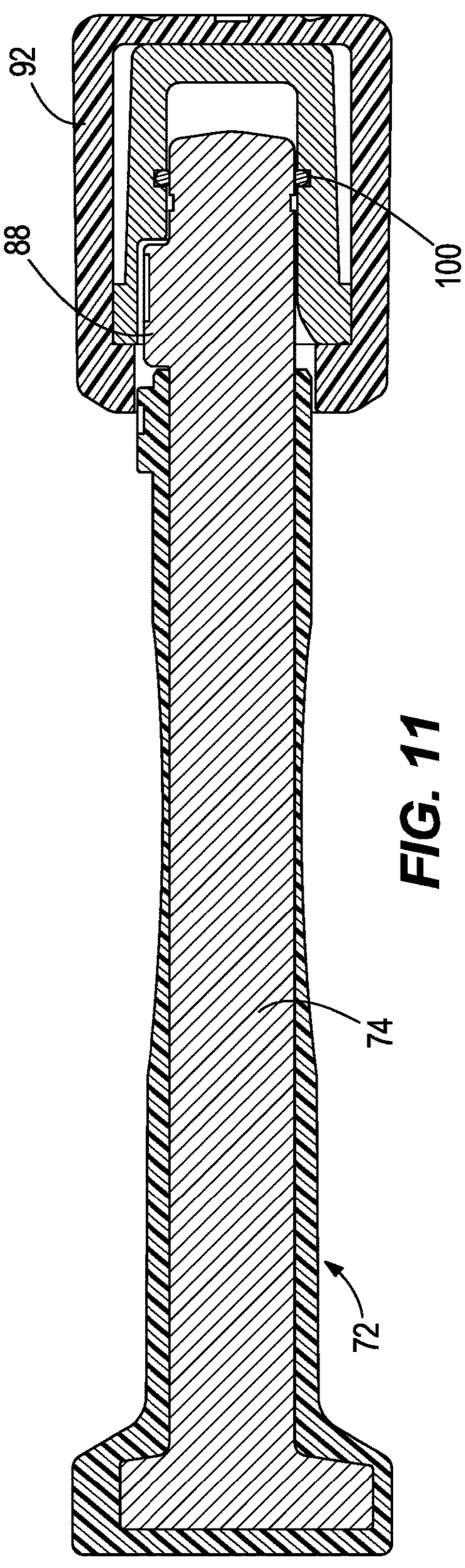
FIG. 11 is a sectional view of the overmolded bolt seal of FIG. 6 in the storage position.
Figure 12:
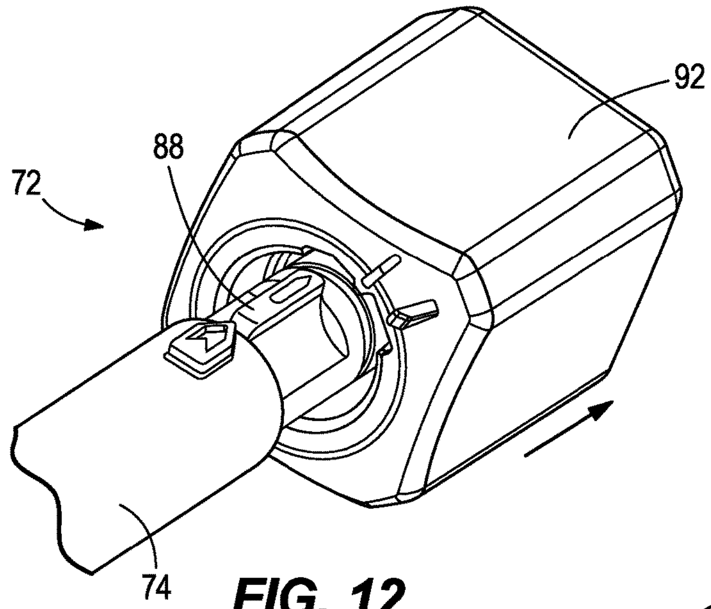
FIG. 12 is a perspective view of the bolt seal of FIG. 6 being moved from its storage position to a lock position.
Figure 13:
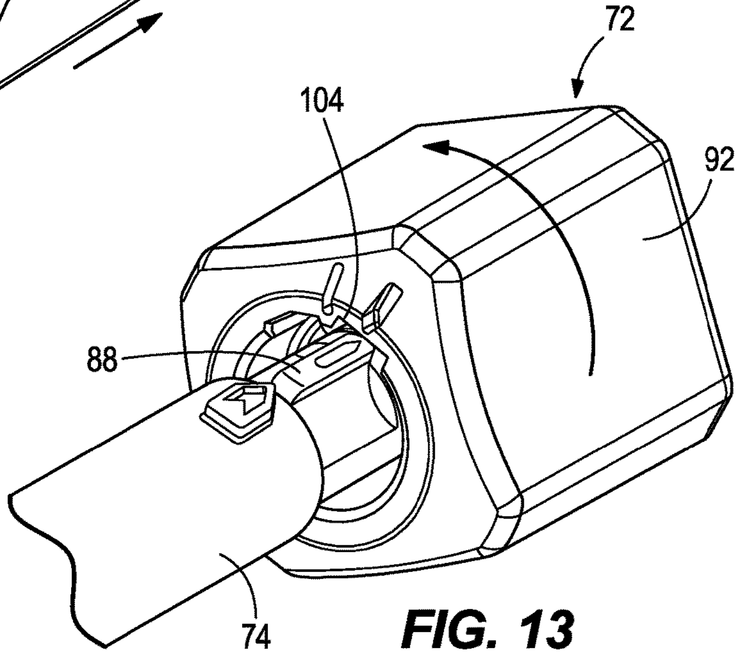
FIG. 13 is a perspective view of the bolt seal of FIG. 6 being placed in the lock position.
Figure 14:
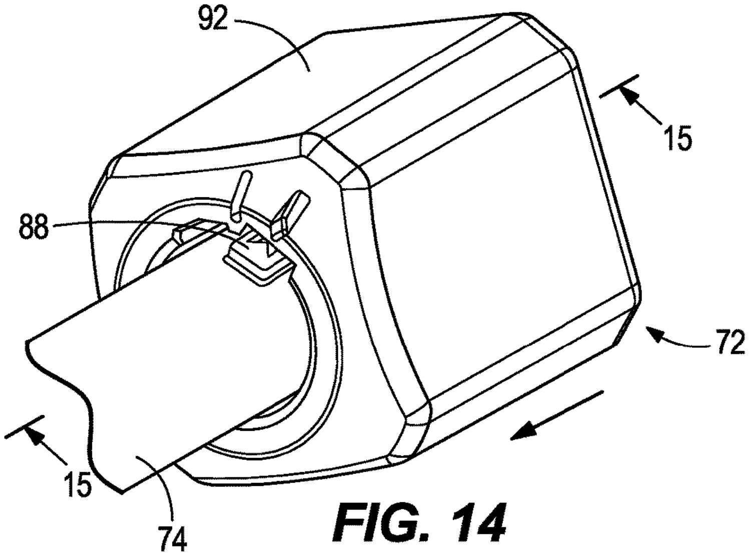
FIG. 14 is a perspective view of the bolt seal of FIG. 6 in the lock position.
Figure 15:
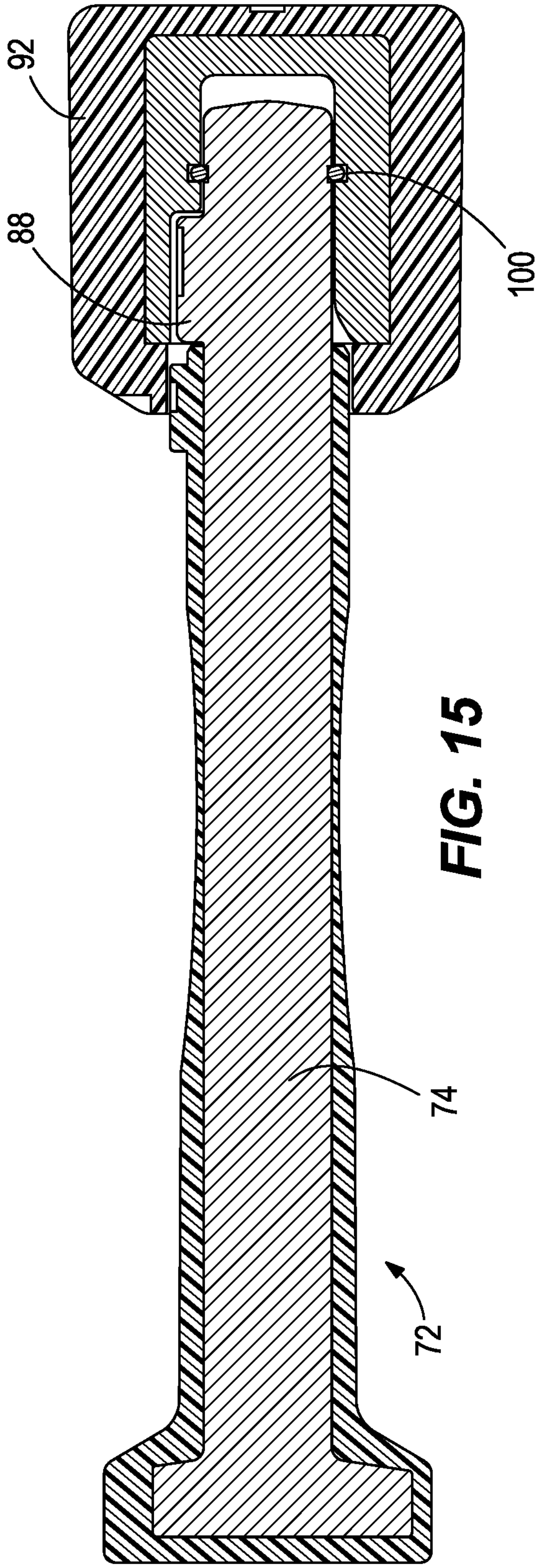
FIG. 15 is a sectional view of the overmolded bolt seal of FIG. 6 in the lock position.

With reference to FIGS. 9-15 and an overmolded bolt seal 72, to place the bolt seal 72 in the storage position, the barrel 92 is aligned with the pin 74 so that the key 88 on the pin 74 is aligned with the first keyway 102 (FIG. 9). The barrel 92 is then slid along the pin 74 in a linear position (shown by an arrow in FIG. 9) to a storage position (FIGS. 10 and 11). In this storage position, the barrel 92 can be slid off the pin 74 by the user with only a minimal amount of force. When the bolt seal 72 is ready to be used on a lock, the barrel 92 is slid off of the pin 74 in a linear motion (shown by an arrow in FIG. 12) and the pin 74 is positioned in the lock (not shown). The barrel 92 is then aligned with the pin 74 so that the key 88 on the pin 74 is aligned with the second keyway 104 on the barrel 92 (FIG. 13). The barrel 92 is then slid along the pin 74 to the lock position where the retaining ring 100 engages the pin 74 and retains the pin 74 in place (FIGS. 14 and 15). Instead of having to snap a pin and a barrel apart at a bridge, then having to rotate and fumble with the barrel to lock them together, the user's actions with bolt seal 72 are much simpler from an ergonomic standpoint, especially when considering that these actions are performed thousands of times by a user. It should be noted that the non-overmolded bolt seal 70 operates in the same manner as with the depicted overmolded bolt seal 72.

Preferably the indicia on the barrel 92 aids a user in moving the barrel 92 from its storage position to its lock position. Specifically, the barrel 92 and the pin 74 can include an arrows. The barrel 92 can include indicia that directs the user to line up the arrows to lock. Such indicia can make use of the bolt seal easier and more poka-yoke.

The bridgeless design of the bolt seal 70, 72 which included a storage position, and a lock position eliminates the need for a bridge that can cause injury, eliminates the part separation effort, eliminates potential user injury, and eliminates material scrap.

The tamper proof design of the bolt seal 70, 72 is not easily defeated thereby increasing theft deterrence. The combination of the retaining ring 100 in the barrel 92 and the strong metal anti-rotation key 88 and keyway 104 of the pin makes it difficult to defeat the security of the bolt seal 70, 72 and difficult to be able to reattach the pin 74 and the barrel 92 to conceal tampering.

Figure 16:
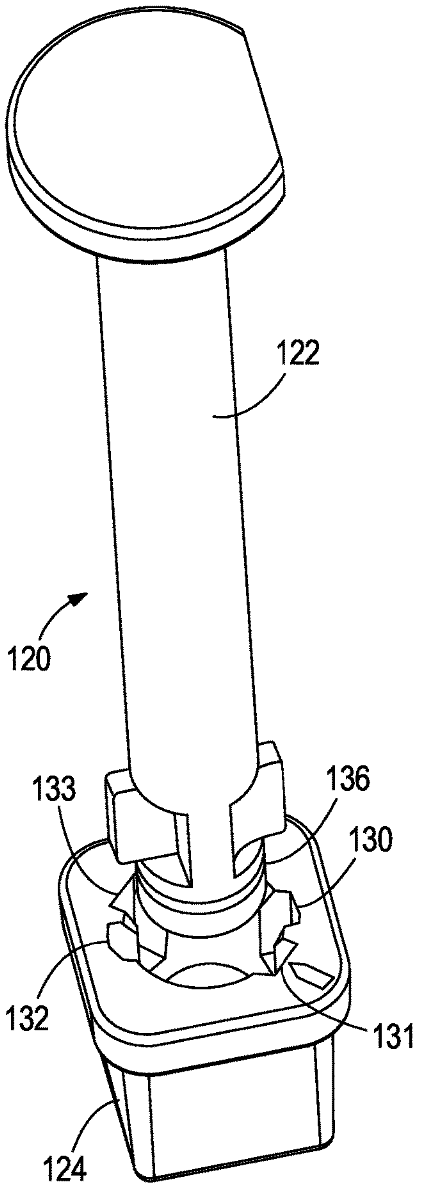
FIG. 16 is a perspective view of another embodiment of a bolt seal.
Figure 17:
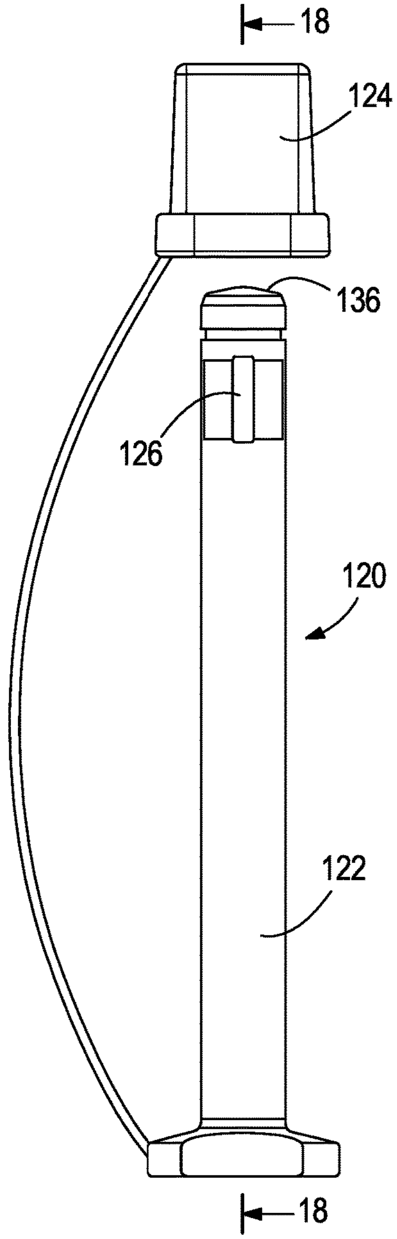
FIG. 17 is a side view of the bolt seal of FIG. 16.
Figure 18:
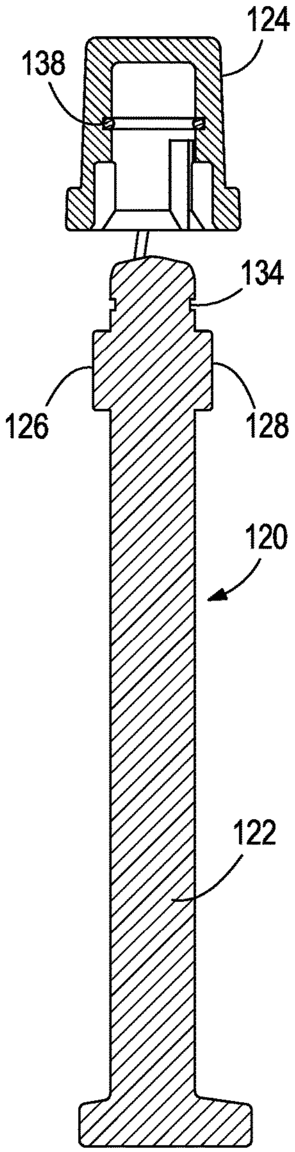
FIG. 18 is a section view taken along line 18-18 of FIG. 17.
Figure 19:
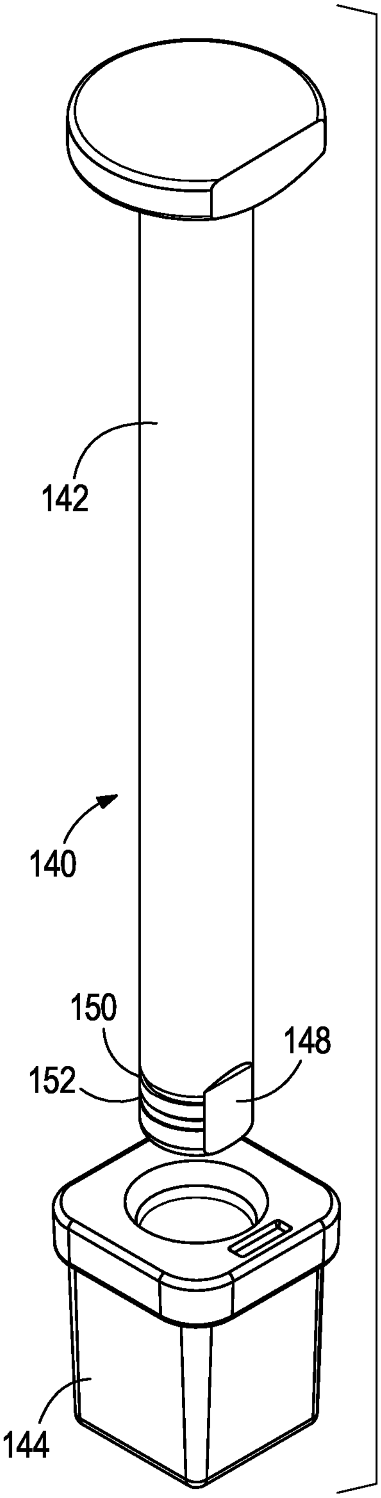
FIG. 19 is a perspective view of another embodiment of a bolt seal.
Figure 20:
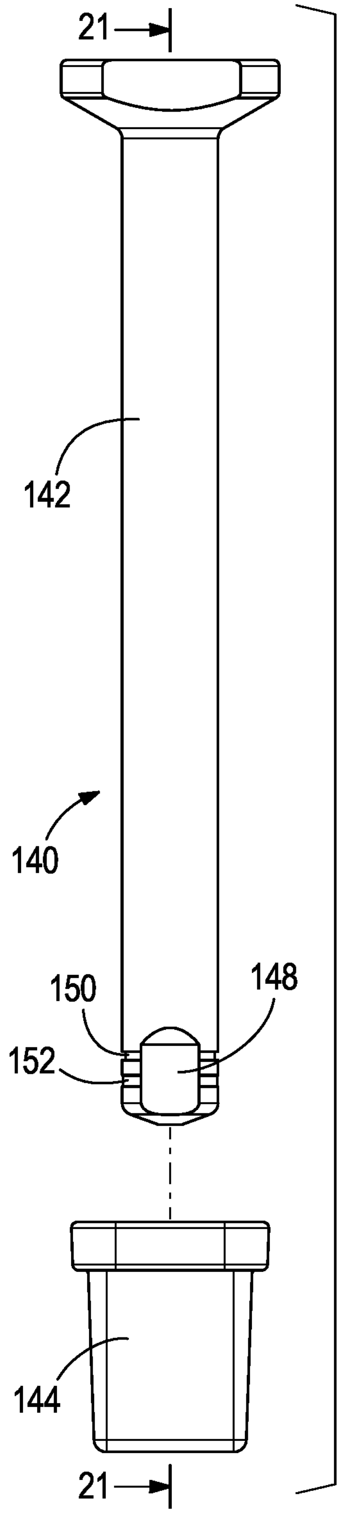
FIG. 20 is a front view of the bolt seal of FIG. 19.
Figure 21:
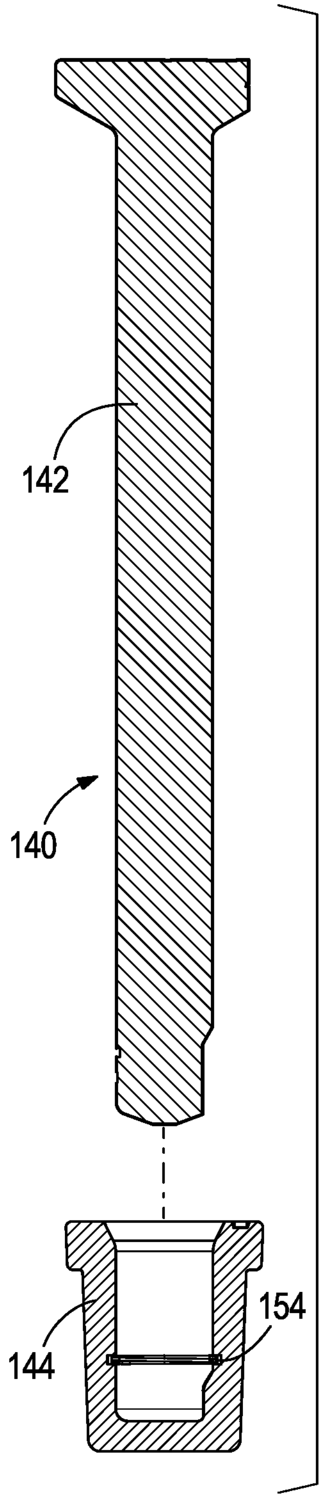
FIG. 21 is a section view taken along line 21-21 of FIG. 20.
Figure 22:
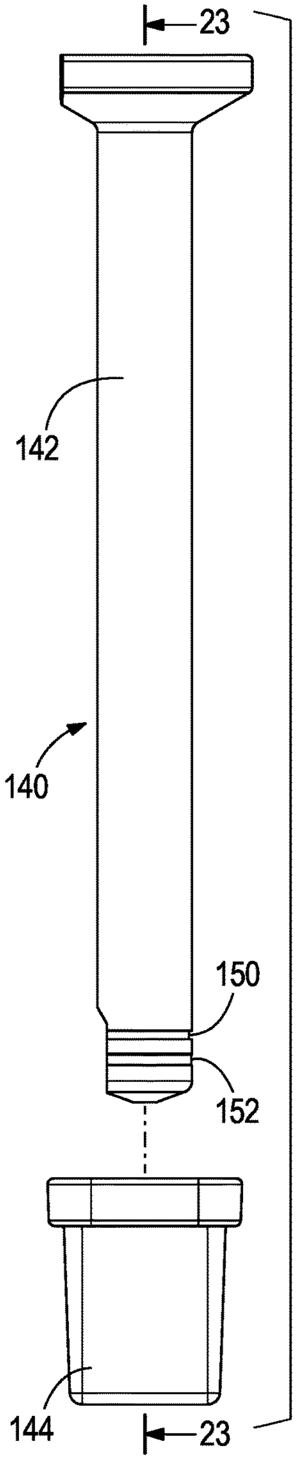
FIG. 22 is a side view of the bolt seal of FIG. 19.
Figure 23:
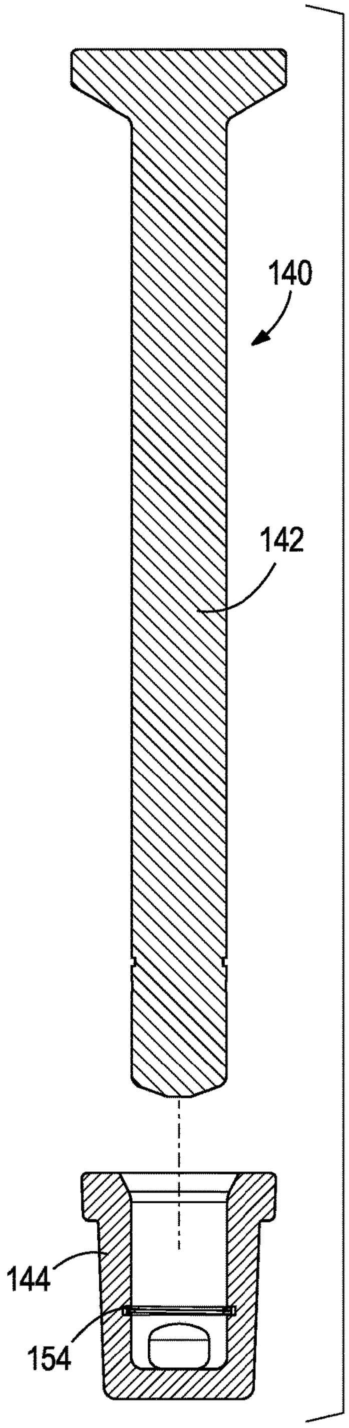
FIG. 23 is a section view taken along line 23-23 of FIG. 22.
Figure 24:
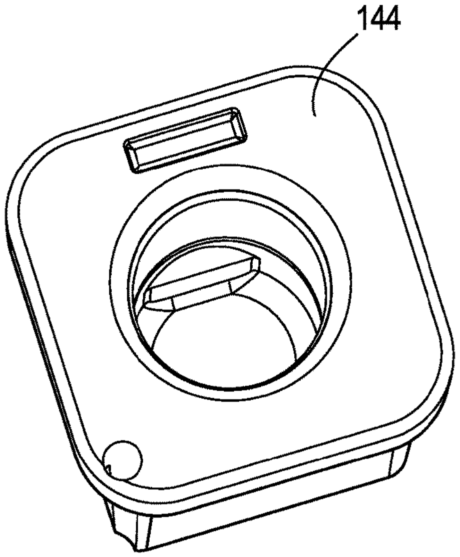
FIG. 24 is a perspective view of a barrel of the bolt seal of FIG. 19.
Figure 25:
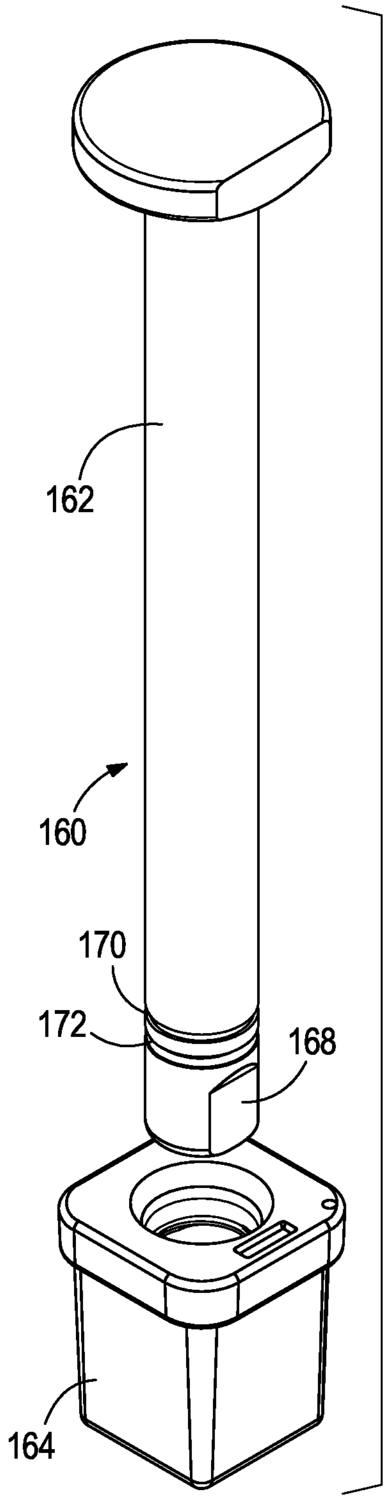
FIG. 25 is a perspective view of another embodiment of a bolt seal.
Figure 26:
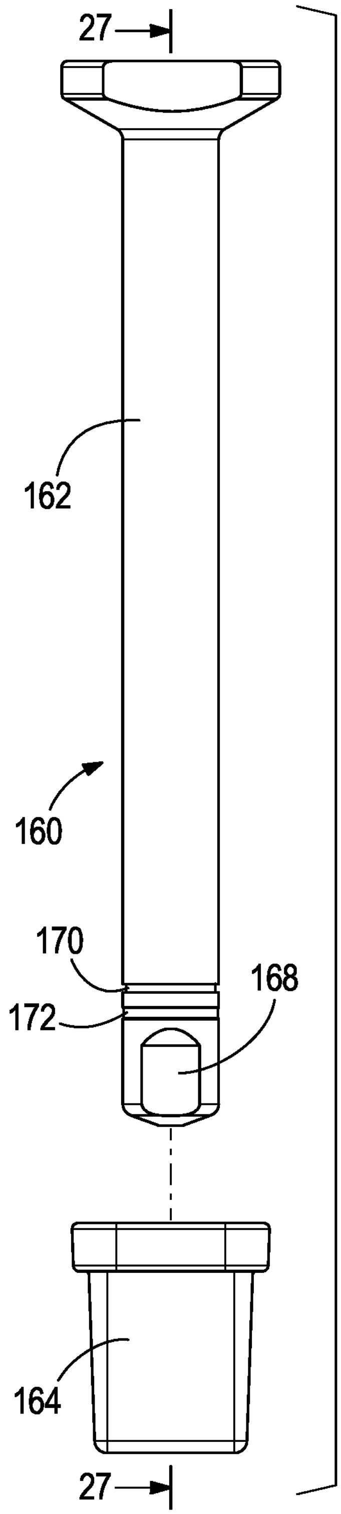
FIG. 26 is a front view of the bolt seal of FIG. 25.
Figure 27:
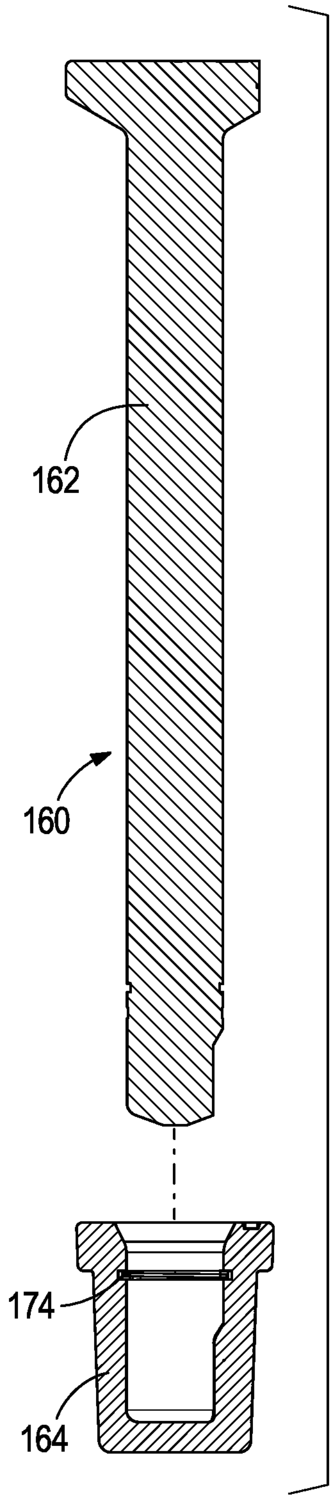
FIG. 27 is a section view taken along line 27-27 of FIG. 26.
Figure 28:
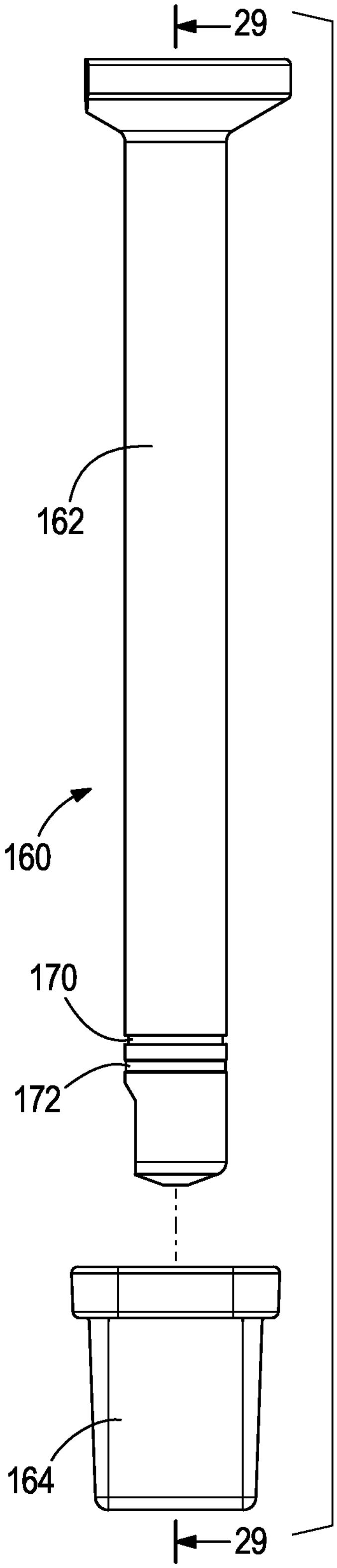
FIG. 28 is a side view of the bolt seal of FIG. 25.
Figure 29:
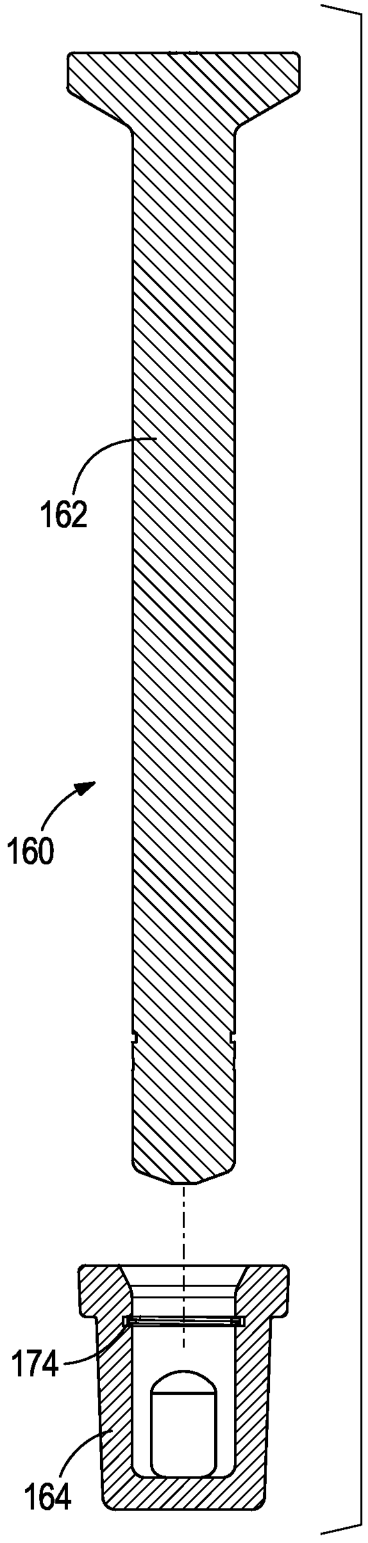
FIG. 29 is a section view taken along line 29-29 of FIG. 28.

Turning now to FIGS. 16-18, in another embodiment of the overmolded bolt seal, the bolt seal 120 includes a pin 122 having more than one key and a barrel 124 having more than two keyways. For example, the pin 122 can have thereon two keys 126, 128 and the barrel 124 can have therein four keyways 130, 131, 132 and 133, two keyways for each key. The pin 122 includes a retaining ring lock groove 134 used when the bolt seal 120 is in the lock position and a shallow groove 136 used when the bolt seal 120 is in the storage position. The barrel 124 includes at least one retaining ring such as retaining ring 138 utilized to hold the pin in position in the barrel 124 when the bolt seal 120 is in the lock position. The bolt seal 120 is used in the same manner as explained above with respect to bolt seal 70.

In another embodiment not shown, the pin 122 can have thereon three keys and the barrel can have therein six keyways, two for each of the three keys. Multiple keys can be utilized for greater anti-rotational strength. The multiple keys on the pin 122 can be of different geometries that are complementary to their associated keyways. Multiple keys can also make the bolt seal easier for a user and make it more poka-yoke. It should be noted that a non-overmolded bolt seal operates in the same manner as with the depicted overmolded bolt seal 120.

As shown in FIGS. 19-24, in the non-overmolded version of another embodiment, a bolt seal 140 includes a pin 142 and a barrel 144. An end of the pin 142 is shaped as a flat key 148 and includes a retaining ring groove 150 and a storage groove 152. The barrel 144 includes at least one retaining ring such as retaining ring 154. To use the bolt seal 140, the pin 142 is inserted into the interior of the barrel 144. A slight push by the user causes the retaining ring 154 to fall into the storage groove 152 so that the bolt seal 140 is in its storage position. A second push of the pin 142 by the user moves the pin 142 past the storage position and deeper into the interior of the barrel 144 to a lock position where the retaining ring 154 locks onto the pin 142 at the retaining ring groove 150. The combination of the metal flat key 148 and the retaining ring 154 in the barrel 144 makes it difficult to defeat the bolt seal 140. It should be noted that the bolt seal 140 of this embodiment can be overmolded and the bolt seal 140 can also include more than one flat key 148 on the pin 142. The flat key 148 makes the bolt seal 140 easier to use and makes it more poka-yoke.

As shown in FIGS. 25-29, in the non-overmolded version of another embodiment, a bolt seal 160 includes a pin 162 and a barrel 164. An end of the pin 162 is shaped as a flat key 168 includes a retaining ring groove 170 and a storage groove 172. It should be noted that the location of the grooves 170 and 172 on the pin 162 is in a different location than that of the bolt seal 140 described above. The barrel 164 includes at least one retaining ring such as retaining ring 174. To use the bolt seal 160, the pin 162 is inserted into the interior of the barrel 164. A slight push by the user causes the retaining ring 174 to fall into the storage groove 172 so that the bolt seal 160 is in its storage position. A second push of the pin 162 by the user moves the pin 162 past the storage position and deeper into the interior of the barrel 164 to a lock position where the retaining ring 174 locks onto the pin 162 at the retaining ring groove 170. The combination of the metal flat key 168 and the retaining ring 174 in the barrel 164 makes it difficult to defeat the bolt seal 160. It should be noted that the bolt seal 160 of this embodiment can be overmolded and the bolt seal 160 can also include more than one flat key 168 on the pin 162. The flat key 168 makes the bolt seal 160 easier to use and makes it more poka-yoke.

It should be noted that the end of the pin that interacts with the barrel can have differing geometries other than those shown herein. For example, other polygonal shapes or other spherical, elliptical or splined shapes can be utilized with complementary shaped barrels, so the bolt seals have a storage position and a lock position where the pin is housed in the barrel of the bolt seal in both positions.

Figure 30:
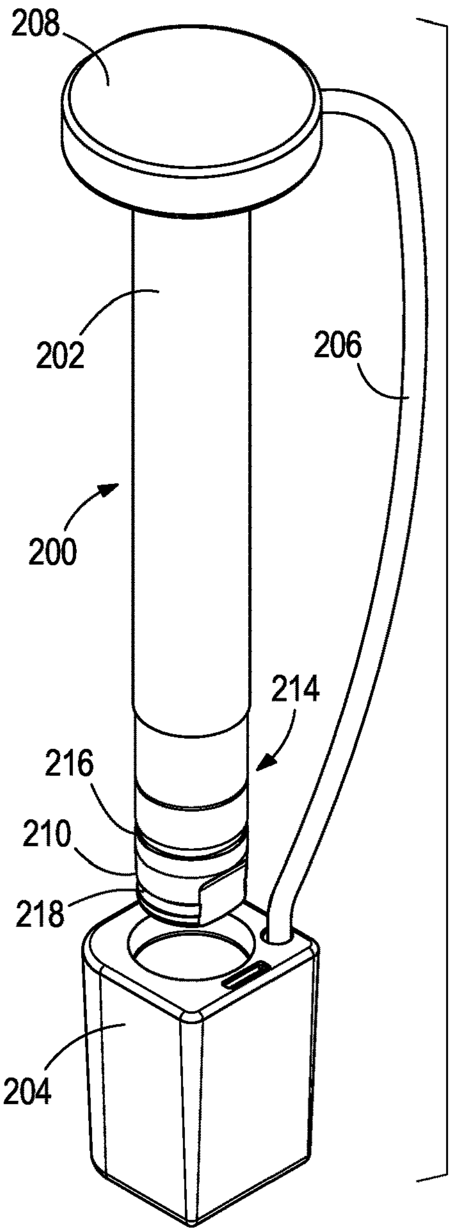
FIG. 30 is a perspective view of another embodiment of a bolt seal.
Figure 31:
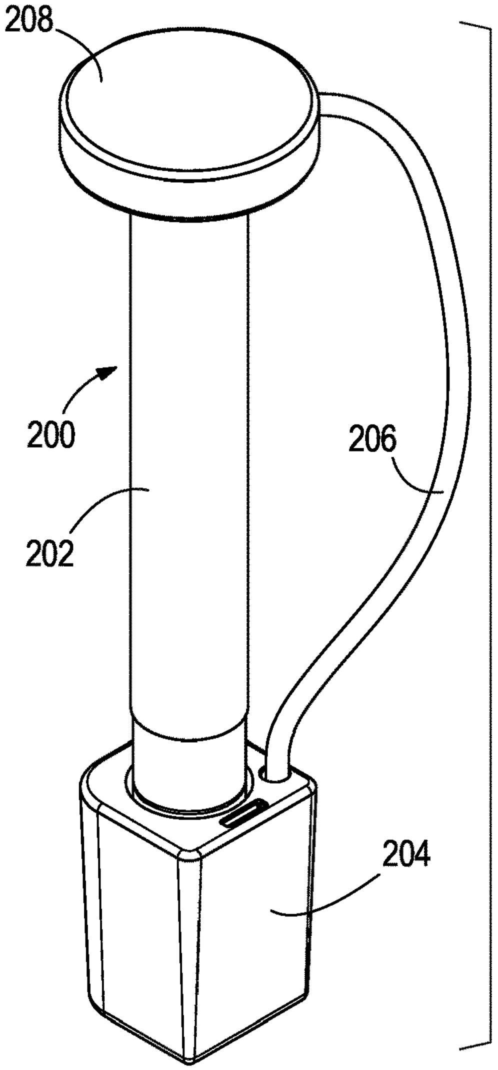
FIG. 31 is a perspective view of the bolt seal of FIG. 30
Figure 32:
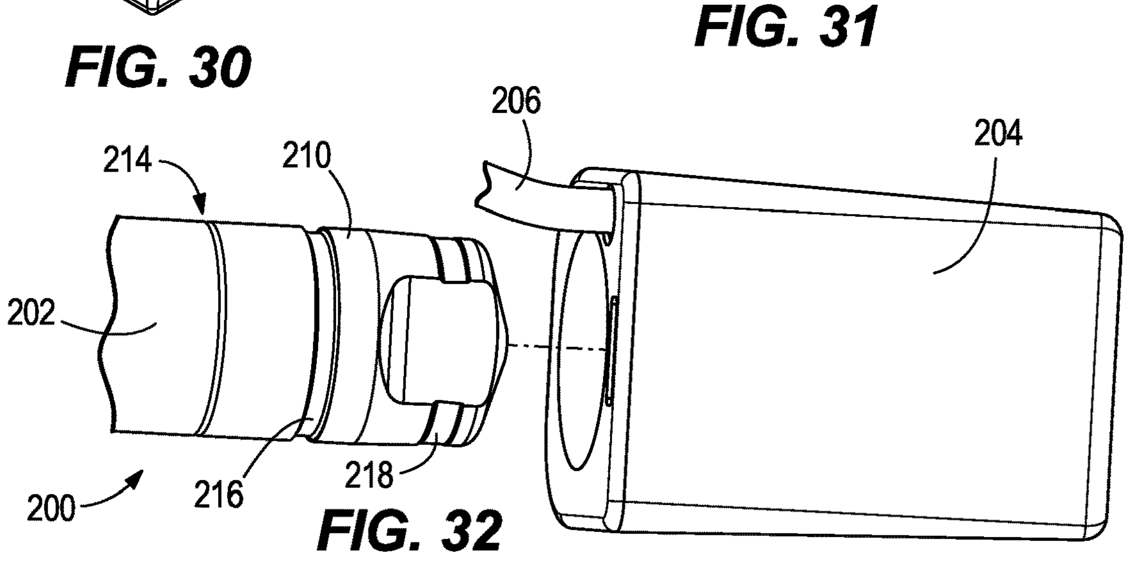
FIG. 32 is a partial perspective view of the bolt seal of FIG. 30

Turning to FIGS. 30-32, as shown in a non-overmolded embodiment, a bolt seal 200 includes a pin 202, a barrel 204 and a restrainer 206. The pin 202 has a first end 208 and a second end 210. The second end 210 is adapted to be housed in the interior of the barrel 204 as shown particularly in FIG. 31. The second end 210 includes a storage indicator groove 214, a lock groove 216 and a storage groove 218. The restrainer 206 connects the first end 208 of the pin 202 with the barrel 204.

As discussed above, all embodiments of the bolt seal can be overmolded such as with a plastic if desired. Use of overmolding includes the ability to add specific color to a bolt seal, may improve its visual appearance for users, can be easier to apply indicia than with metal and tampering may be more visually apparent.

Various features and advantages of the invention are set forth in the following claims.

What is claimed is:

1. A bolt seal comprising:

a pin having a key; and a barrel having a storage position on the pin and being moveable from the storage position to a locking position by repositioning the key in the barrel in a different radial orientation such that the pin and the barrel are lockingly secured together.

2. A bolt seal comprising:

a pin having a key; and a barrel having an axis, a first keyway and a second keyway, the pin having a first position relative to the barrel by axially moving the key into the first keyway and the pin having a second position relative to the barrel by axially moving the key into the second keyway, wherein the first and second keyways are radially adjacent.

3. A non-electric bolt seal comprising:

a non-electrified pin having a first end, a second end and a diameter;

a non-electric barrel lockingly secured to the first end of the pin; and a non-electric retainer fabricated of a single material, being uniform in cross section, having a diameter smaller than the diameter of the pin, and connecting the second end of the pin to the barrel such that when the pin is severed into two pieces after use of the bolt seal has ended, the retainer enables the bolt seal to be removed from the lock in one piece.

4. A bolt seal comprising:

a pin;

a barrel having a storage position and a locking position relative to the pin; and a retainer connecting the pin and the barrel;

wherein the barrel is moveable from the storage position to the locking position by removal of the pin from the barrel and repositioning the barrel on the pin with the retainer maintaining the connection between the pin and the barrel during removal and repositioning.

* * * * *